(12) United States Patent
Levy et al.

(10) Patent No.: US 12,039,378 B2
(45) Date of Patent: Jul. 16, 2024

(54) IN-BAND MODIFICATION OF EVENT NOTIFICATION PREFERENCES FOR SERVER EVENTS

(71) Applicant: EMC IP Holding Company LLC, Hopkinton, MA (US)

(72) Inventors: Shoham Levy, Ra'anana (IL); Doron Tal, Geva Carmel (IL)

(73) Assignee: EMC IP Holding Company LLC, Hopkinton, MA (US)

( * ) Notice: Subject to any disclaimer, the term of this patent is extended or adjusted under 35 U.S.C. 154(b) by 341 days.

(21) Appl. No.: 17/381,722

(22) Filed: Jul. 21, 2021

(65) Prior Publication Data

US 2023/0028407 A1    Jan. 26, 2023

(51) Int. Cl.
*G06F 9/46* (2006.01)
*G06F 9/54* (2006.01)
*G06F 11/30* (2006.01)
*G06F 11/34* (2006.01)
*G06N 20/00* (2019.01)

(52) U.S. Cl.
CPC .......... *G06F 9/542* (2013.01); *G06F 11/3075* (2013.01); *G06F 11/3438* (2013.01); *G06N 20/00* (2019.01); *G06F 2201/86* (2013.01)

(58) Field of Classification Search
CPC .. G06F 9/542; G06F 11/3075; G06F 11/3438; G06F 2201/86; G06N 20/00
See application file for complete search history.

(56) References Cited

U.S. PATENT DOCUMENTS

| 9,912,619 B1* | 3/2018 | Kohli | H04L 51/046 |
| 10,761,813 B1* | 9/2020 | Echeverria | G06F 8/34 |
| 2005/0013257 A1* | 1/2005 | Garyfalos | G06F 9/542 |
| | | | 370/252 |

OTHER PUBLICATIONS https://stripe.com/docs/webhooks, downloaded on Jul. 14, 2021.
https://www.adobe.io/apis/experienceplatform/events/docs.html#!adobedocs/adobeio-events/master/intro/webhooks_intro.md, downloaded on Jul. 14, 2021.
https://aws.amazon.com/eventbridge/, downloaded on Jul. 14, 2021.
https://community.bmc.com/s/article/BMC-Middleware-and-Transaction-Management-How-to-work-with-WebSphere-MQ-Queue-Manager-event-messages, downloaded on Jul. 14, 2021.

* cited by examiner

*Primary Examiner* — Gregory A Kessler
(74) *Attorney, Agent, or Firm* — Ryan, Mason & Lewis, LLP

(57) ABSTRACT

Techniques for in-band modification of event notification preferences for server events are provided. One method comprises obtaining an event notification; providing the event notification to a target device based on rule-based preferences of a user associated with the target device; obtaining a reply to the event notification from the target device, wherein the reply comprises event preferences of the user; and updating the rule-based preferences of the user based on the event preferences of the user. The updating of the rule-based preferences of the user may comprise creating, modifying and/or canceling at least one event preference rule of the user. A plurality of the event preference rules matching the event notification may be resolved in an order determined by one or more event preference rule resolution criteria.

20 Claims, 8 Drawing Sheets

| RULES 510 | WEBHOOK TARGET 520 | FILTER 530 | BLOCK/SEND 540 |
|---|---|---|---|
| 1 | A | SEVERITY=ERROR<br>TOPIC=HW_FAILURE | BLOCK |
| 2 | A | SEVERITY=ERROR<br>TOPIC=HW_FAILURE<br>RESOURCE_TYPE=POWER_SUPPLY | SEND |
| 3 | A | SEVERITY=ERROR<br>TOPIC=NETWORKING_ERROR | SEND |
| 4 | B | SEVERITY=INFO | BLOCK |
| 5 | B | SEVERITY=CRITICAL | SEND |

IN-BAND MODIFICATION OF EVENT NOTIFICATION PREFERENCES FOR SERVER EVENTS

FIELD

The field relates generally to information processing systems, and more particularly to event processing techniques in such systems.

BACKGROUND

A publish/subscribe system typically has one or more publishers (e.g., servers) and multiple subscribers (e.g., clients) for a number of different topics. A publisher may generate many messages and a given subscriber may only be interested in a subset of the generated messages. Messages in such publish/subscribe systems are sent to subscribers based on a topic or subject describing the contents of each message and event notification preferences of each subscriber.

A need exists for improved techniques for registering subscriber event notification preferences.

SUMMARY

In one embodiment, a method comprises obtaining an event notification; providing the event notification to at least one target device based at least in part on one or more rule-based preferences of a user associated with the at least one target device; obtaining a reply to the event notification from the at least one target device, wherein the reply comprises one or more event preferences of the user; and updating the one or more rule-based preferences of the user based at least in part on the one or more event preferences of the user.

In some embodiments, the updating the one or more rule-based preferences of the user comprises one or more of creating, modifying and canceling at least one event preference rule of the user. A plurality of the event preference rules matching the event notification may be resolved in an order determined by one or more event preference rule resolution criteria.

Other illustrative embodiments include, without limitation, apparatus, systems, methods and computer program products comprising processor-readable storage media.

BRIEF DESCRIPTION OF THE DRAWINGS

FIG. 5 illustrates an exemplary table for recording rule-based event notification preferences of a given event client node of FIG. 1, according to an embodiment;

DETAILED DESCRIPTION

Figure 1:
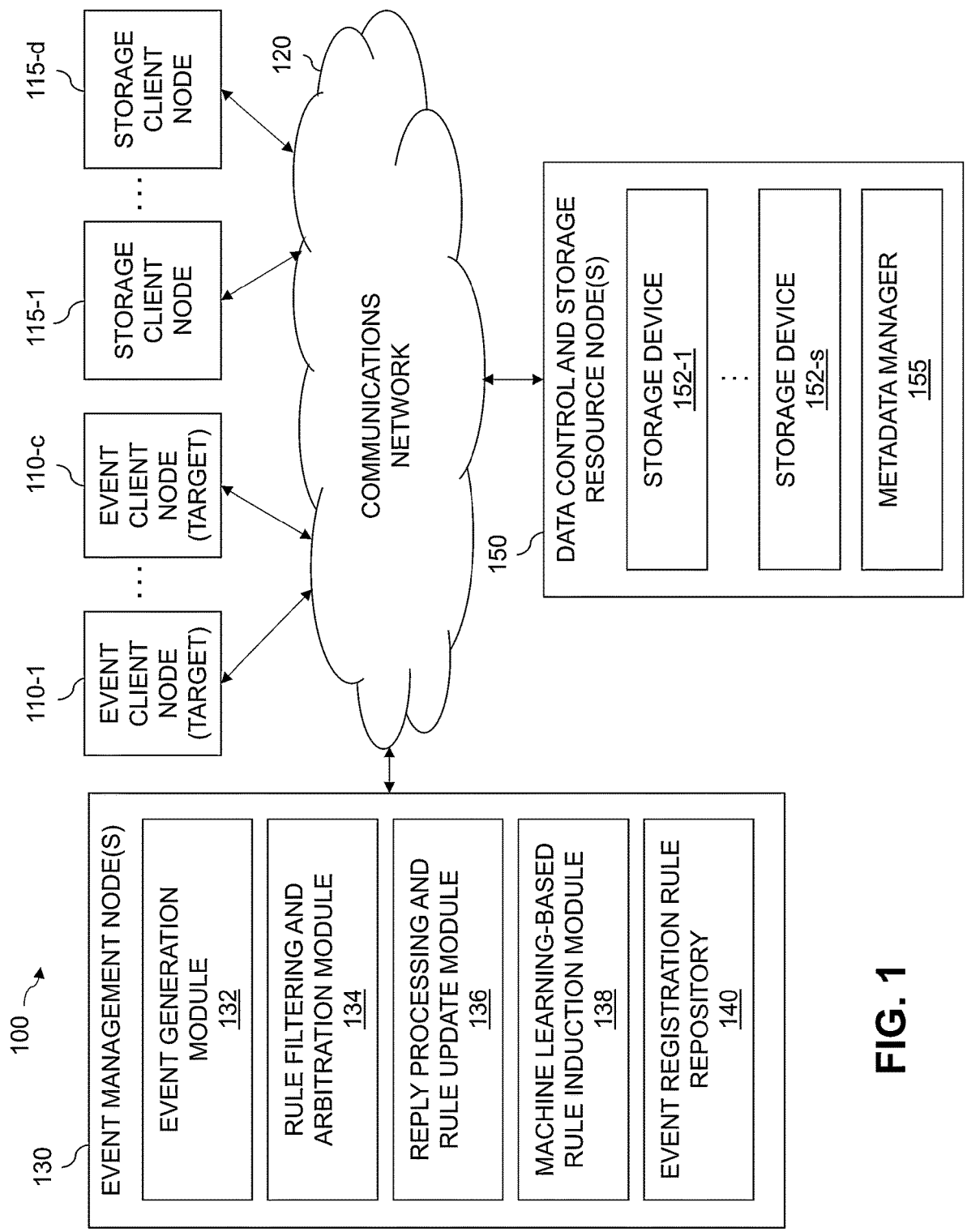
FIG. 1 is a high-level schematic illustration of a computing system comprising an exemplary software-defined storage system that provides in-band modification of event notification preferences for server events, according to an exemplary embodiment of the disclosure.

Illustrative embodiments of the present disclosure will be described herein with reference to exemplary communication, storage and processing devices. It is to be appreciated, however, that the disclosure is not restricted to use with the particular illustrative configurations shown. One or more embodiments of the disclosure provide methods, apparatus and computer program products for providing in-band modification of event notification preferences for server events.

One or more embodiments of the disclosure provide improved techniques for registering subscriber event notification preferences. As noted above, a server may generate many events on various topics, but a client may only be interested in a subset of the generated events. REST (Representational State Transfer) hooks (e.g., for webhooks) and Message Queue (MQ) topics and filters, for example, allow a client to register to receive a selected subset of events, typically using a pre-registration of the client. Such registrations are typically modified in an offline manner using a parallel mechanism to the actual event sending mechanism.

In some embodiments of the present disclosure, event preferences are modified in-band with the events themselves by the client or target device returning such event preferences back to the server as a reply to a received event. In one or more embodiments, the event preference replies can be related to the same topic as the received event or to one or more different topics.

While one or more embodiments of the disclosure are illustrated herein using modification of event notification preferences in a storage environment, the disclosed techniques for providing in-band modification of event notification preferences for server events can be employed for modifying event notification preferences in any environment, as would be apparent to a person of ordinary skill in the art. In addition, while one or more embodiments of the disclosure are illustrated herein using webhooks as an example of an Application Programming Interface (API), other event-driven APIs may also be employed, as would be apparent to a person of ordinary skill in the art.

A webhook message may contain one or more events. In at least some embodiments, an event is a map of keys and values. Each event has a topic, and usually an event identifier and a severity level. A given event may also contain additional information, in the form of key values. A topic may be a system identifier, an identifier of a server resource, a type of a server resource, or any other identifier defined by the event server. The event severity level is an indicator of the impact of an event, such as informational, warning, error or critical. The event identifier may be a unique identifier for a specific event instance (e.g., an event identifier cannot repeat itself in the system).

A client endpoint, upon receiving a webhook, may not know in advance all possible topics of server events, nor all possible event fields (e.g., keys). The client endpoint does know which events are of interest by at least a subset of their keys and values (e.g., topic, severity, or any other event field). When receiving a webhook, the client endpoint prepares a list of zero or more event preferences, as a reply to the server, as discussed further below in conjunction with FIG. 3, for example.

In one or more embodiments, an event preference is a map of one or more event keys with values, and the desired registration status for the combination of these values. The desired registration status in at least some examples can be true, false or cancel (e.g., send such events to the client, do not send such events to the client, or cancel a rule that matches all values, if it exists).

When the server receives the reply on its webhook, for example, the server interprets the event preferences and creates, modifies or cancels appropriate event registration rules (e.g., event notification preferences) for that client. Whenever an event is to be sent to the webhook client, a full list of rules that match the event is compiled, in some embodiments, and the event is checked against all of the compiled rules. In at least some embodiments, all events are sent, by default, and explicit rules are needed to block the sending of particular events. In addition, positive event rules may be used to overcome the blocking of rules, in order to allow expressions of finer granularity.

FIG. 1 is a high-level schematic illustration of a computing system comprising a software-defined storage system that provides in-band modification of event notification preferences for server events, according to an exemplary embodiment of the disclosure. More specifically, FIG. 1 schematically illustrates a computing system 100 which comprises a plurality of event client nodes 110-1 through 110-c (collectively referred to as event client nodes 110), a plurality of storage client nodes 115-1 through 115-d (collectively referred to as storage client nodes 115), a communications network 120, one or more event management nodes 130 and one or more data control and storage resource nodes 150.

In at least some embodiments, one or more of the event management nodes 130 may be implemented as a Kubernetes management cluster. The data control and storage resource nodes 150 may comprise a software-defined storage control system. As shown in FIG. 1, each of the data control and storage resource nodes 150 comprises a plurality of storage devices 152-1 through 152-s (collectively referred to as storage devices 152) and a metadata manager (MDM) 155. The storage devices 152 may be implemented, for example, as storage data servers (SDSs). The MDM 155 can be configured in some embodiments with one or more members on one or more servers. The MDM 155 can be on a same node 150 as one or more of the storage devices 152, or on at least one separate and distinct node 150.

The event client nodes 110 are discussed further below in conjunction with FIG. 2. The event client nodes 110 comprise logic to react to events received from the event management nodes 130. The event client nodes 110 can identify events that are interesting to the user of the respective event client node 110, as well as events that are not interesting to the user of the respective event client node 110. Upon receipt of an event notification from an event management node 130, the receiving event client node 110 can reply to the event notification to convey one or more event preferences of the user of the receiving event client node 110 to the event management node 130. In this manner, using the disclosed techniques for in-band registration, the receiving event client node 110 can adjust registration rules on its own (e.g., without prior knowledge of the possible registration end points (e.g., filters) of the event management node 130).

The storage client nodes 115 include various types of applications that issue data input/output (I/O) requests to storage volumes. For example, the storage client nodes 115 may include user applications, server applications, database applications, virtual machines and containers. The storage client nodes 115 can be hosted by, and execute on, various types of computing devices and systems including, but not limited to, desktop computers, laptop computers, workstations, computer servers, enterprise servers, rack servers, smart phones and electronic tablets.

While the communications network 120 is generically depicted in FIG. 1, it is to be understood that the communications network 120 may comprise any known communication network such as a global computer network (e.g., the Internet), a wide area network (WAN), a local area network (LAN), an intranet, a satellite network, a telephone or cable network, a cellular network, a wireless network such as Wi-Fi or WiMAX, a storage fabric (e.g., Ethernet storage network), or various portions or combinations of these and other types of networks. The term "network" as used herein is therefore intended to be broadly construed so as to encompass a wide variety of different network arrangements, including combinations of multiple networks possibly of different types, which enable communication using, e.g., Internet Protocol (IP) or other communication protocols such as Fibre Channel data transfer protocol, and an iSCSI (Internet Small Computer Systems Interface) data transfer protocol, to support storage network connectivity.

In some embodiments, the data control and storage resource nodes 150 comprise direct-attached storage (DAS) resources (e.g., internal and/or external storage resources), wherein the storage devices 152 are virtually pooled into shared block storage by the control system. For example, the storage devices 152 include the same type, or a combination of different types of persistent storage devices (e.g., physical block devices) such as hard disk drives (HDDs), solid-state drives (SSDs) (e.g., flash storage devices), peripheral component interconnect express (PCIe) flash cards, or other types and combinations of non-volatile memory. The data control and storage resource nodes 150 may be directly connected to the event management node 130 through, e.g., a host bus adapter, and using suitable protocols such as ATA (AT Attachment), SATA (Serial ATA), eSATA (external Serial ATA), non-volatile memory express (NVMe), SCSI, and SAS. In an exemplary embodiment, the storage devices 152 include both HDD and SSD storage devices. As is known in the art, SSD storage devices provide faster storage performance than HDD devices.

While FIG. 1 generally depicts the software-defined storage environment having a single event management node 130, it is to be understood that in other embodiments, the system 100 of FIG. 1 can implement a cluster of two or more event management nodes 130. Although not shown in FIG. 1, each event management node 130 may comprise a control system for the data control and storage resource nodes 150.

In the software-defined storage environment of FIG. 1, for purposes of discussion, the term "node" or "data control and storage resource node" as used herein refers to a single node which comprises physical block devices (e.g., HDD devices and SSD devices). The control system exposes abstractions of block devices (e.g., virtual block devices). For example, a virtual block device can correspond to a volume of a storage pool. Each virtual block device spans across any number of actual physical storage devices, which are referred to herein as "storage pools." For illustrative purposes, it is assumed that each "storage pool" is homogenous in terms of the type of storage devices within the group (e.g., a storage pool can include only HDD devices or SSD devices). In addition, different storage pools can have the same type of storage device, but a different number of storage devices. For example, a first storage pool can include 10 HDDs, a second storage pool can include 100 HDDs, a third storage pool can include 50 SSDs, and a fourth group can include 100 SSDs.

The control system is a component of the software-defined storage environment shown in FIG. 1. In some embodiments, the software-defined storage environment comprises other components such as data clients, which are not specifically shown in FIG. 1. The control system comprises a software layer that may be deployed on one or more event management nodes 130 and configured to provision, orchestrate and manage the physical data control and storage resource nodes 150. For example, the control system implements methods that are configured to create and manage storage pools by aggregating capacity from the physical storage devices 152 (e.g., virtual pools of block storage).

The control system supports the virtualization of storage by separating the control and management software from the hardware architecture. The control system is configured to abstract storage access services from the underlying storage hardware to thereby control and manage I/O requests issued by the storage client nodes 115, as well as to support networking and connectivity.

As shown in FIG. 1, the event management node 130 comprises an event generation module 132, a rule filtering and arbitration module 134, a reply processing and rule update module 136, a machine learning-based rule induction module 138 and an event registration rule repository 140. Generally, the event generation module 132 generates one or more events, for example, related to one or more of the data control and storage resource nodes 150 (or portions thereof, such as one or more components of a given data control and storage resource node 150). The exemplary rule filtering and arbitration module 134 evaluates the generated events against one or more rules in the event registration rule repository 140 and the rules are sent to particular event client nodes 110 based on processing by the rule filtering and arbitration module 134. The exemplary reply processing and rule update module 136 processes replies received from event client nodes 110 to event notifications that convey one or more event preferences of the respective user of a given event client node 110. The reply processing and rule update module 136 updates one or more rules in the event registration rule repository 140 based on the event preferences of the respective user in a given reply. The machine learning-based rule induction module 138 may update or create one or more rules based on behavior of a given user.

It is to be appreciated that this particular arrangement of modules 132, 134, 136, 138 and rule repository 140 illustrated in the event management node 130 of the FIG. 1 embodiment is presented by way of example only, and alternative arrangements can be used in other embodiments. For example, the functionality associated with modules 132, 134, 136, 138 and rule repository 140 in other embodiments can be combined into a single module, or separated across a larger number of modules. As another example, multiple distinct processors can be used to implement different ones of modules 132, 134, 136, 138 and rule repository 140 or portions thereof. In some embodiments, the rule repository 140 or portions thereof may be implemented on a separate and distinct node than other portions of the event management node 130.

At least portions of one or more of the modules 132, 134, 136, 138 and rule repository 140 may be implemented at least in part in the form of software that is stored in memory and executed by a processor. An exemplary process utilizing one or more of modules 132, 134, 136, 138 and rule repository 140 for an example event management node 130 in computing system 100 will be described in more detail with reference to, for example, FIGS. 4 and 7.

In some embodiments, the system 100 may include one or more host application servers. A storage data client (SDC) may be deployed in each host application server that hosts one or more of the storage client nodes 115 requiring access to the block devices exposed and managed by the control system. The SDC exposes block devices representing the virtual storage volumes that are currently mapped to that host. In particular, the SDC serves as a block driver for a client (server) to access the block storage that is managed by the control system. The SDC provides the operating system or hypervisor (that runs the SDC) access to the logical block devices (e.g., volumes). The SDCs have knowledge of which control systems hold its block data, so multipathing can be accomplished natively through the SDCs. Metadata managers manage the SDC-to-control system data mappings.

As noted above, computing system 100 comprises a software-defined storage system that implements the disclosed techniques for modifying event notification preferences. In one exemplary implementation, the software-defined storage system may be implemented using the Dell EMC PowerFlex® software-defined storage solution, commercially available from Dell Technologies. Other software-defined storage systems include the ScaleIO™ software-defined storage product and/or the VxFlex OS® software-defined storage product.

Figure 2:
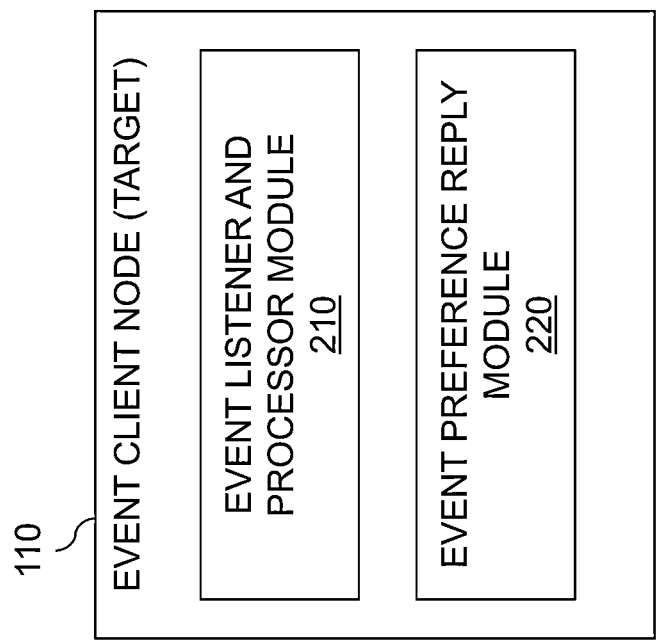
FIG. 2 illustrates an exemplary event client node of FIG. 1, in further detail, according to some embodiments.

FIG. 2 illustrates an exemplary event client node 110 of FIG. 1, in further detail, according to some embodiments. The event client node 110 is the target of one or more event notifications. As shown in FIG. 2, the event client node 110 comprises an event listener and processor module 210 and an event preference reply module 220. Generally, the event listener and processor module 210 listens for events received from an event management node 130 (e.g., waits for a connection from an event management node 130) and processes such received events, as discussed further below. Upon receipt of an event notification from an event management node 130, the event preference reply module 220 of receiving event client node 110 can reply to the event notification to convey one or more event preferences of the user of the receiving event client node 110 to the event management node 130. In this manner, using the disclosed techniques for in-band registration, the receiving event client node 110 can adjust registration rules on its own (e.g., without prior knowledge of the possible registration end points (e.g., filters) of the event management node 130).

It is to be appreciated that this particular arrangement of modules 210, 220 illustrated in the event client nodes 110 of the FIG. 2 embodiment is presented by way of example only, and alternative arrangements can be used in other embodiments. For example, the functionality associated with modules 210, 220 in other embodiments can be combined into a single module, or separated across a larger number of modules. As another example, multiple distinct processors can be used to implement different ones of modules 210, 220 or portions thereof.

At least portions of one or more of the modules 210, 220 may be implemented at least in part in the form of software that is stored in memory and executed by a processor. An exemplary process utilizing one or more of modules 210, 220 for an example event client node 110 in computing system 100 will be described in more detail with reference to, for example, FIGS. 3 and 7.

Figure 3:
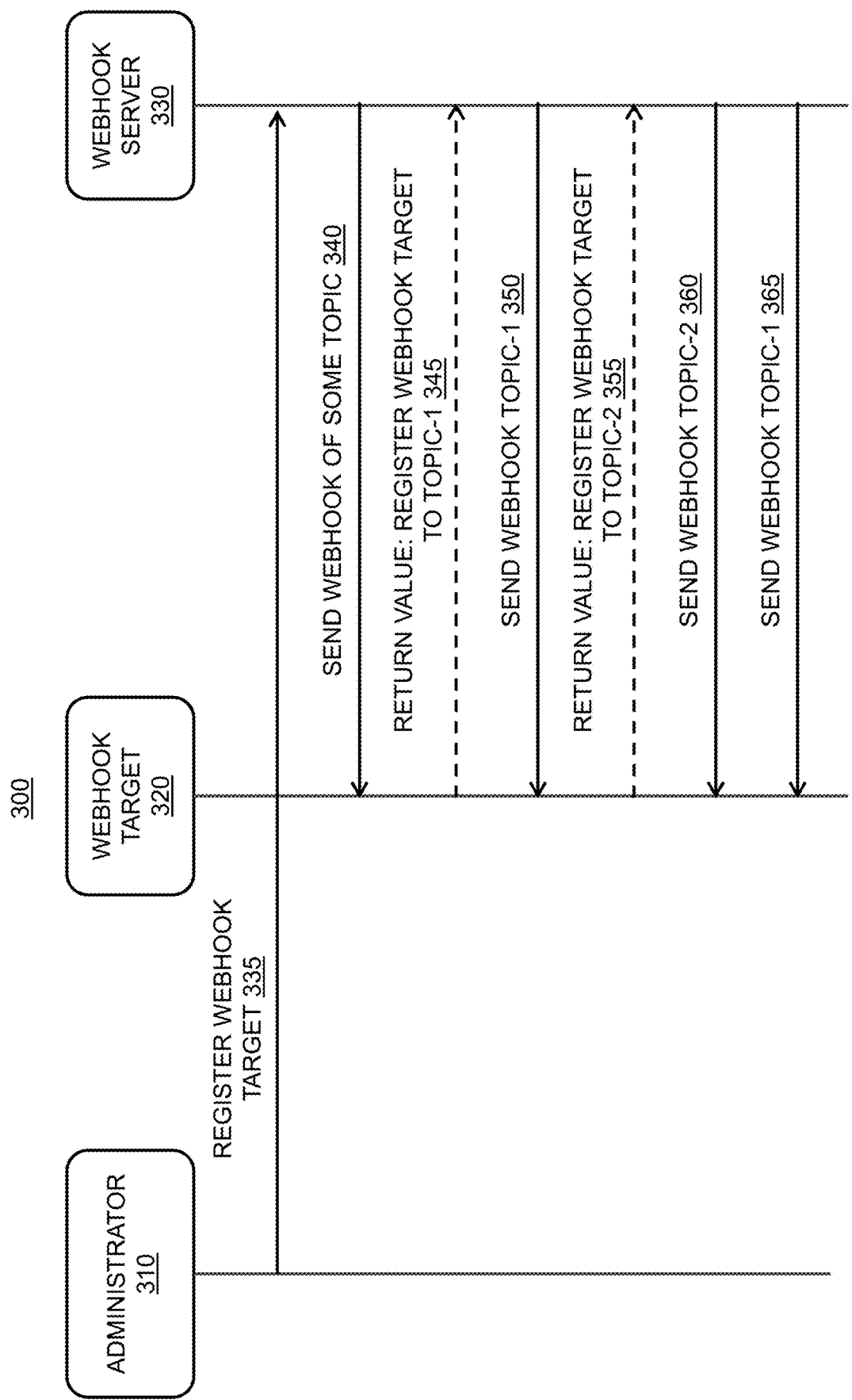
FIG. 3 illustrates an exemplary communication diagram for providing in-band modification of event notification preferences for server events, according to an embodiment of the disclosure.

FIG. 3 illustrates an exemplary communication diagram 300 for providing in-band modification by a webhook target 320 (e.g., an event client node 110 of FIG. 1) of event notification preferences for events received from a webhook server 330 (e.g., an event management node 130 of FIG. 1), according to an embodiment of the disclosure. In the example of FIG. 3, an administrator 310 registers the webhook target 320 in step 335 to receive events from the webhook server 330. In one embodiment, the webhook target 320 may initially be registered to receive all events from the webhook server 330. The administrator 310 may provide a network address, such as a Uniform Resource Locator (URL) of the webhook target 320 to the webhook server 330 as part of the registration. Thereafter, the webhook server 330 will call the registered URL with events, as needed.

When one or more events occur, the webhook server 330 looks for relevant event filters for the webhook target 320 (e.g., in the event registration rule repository 140). In at least some embodiments, if several events are to be sent together, the webhook server 330 applies the filters from the event registration rule repository 140 separately on each event. The webhook server 330 uses one or more event preference rule resolution criteria, as discussed further below in conjunction with FIG. 4, to resolve conflicting filters in the event registration rule repository 140 and to decide which events should be sent to the webhook target 320.

The webhook server 330 sends the filtered list of events to the webhook target 320, e.g., by making a Hypertext Transfer Protocol (HTTP) call to the URL endpoint of the webhook target 320. In the example of FIG. 3, the webhook server 330 sends a webhook (e.g., an event) of some topic to the webhook target 320 in step 340.

The webhook target 320 receives the list of events and has logic (e.g., the event listener and processor module 210) to deal with some, or all, of the received events. In the example of FIG. 3, the webhook target 320 prepares one or more event preferences to return as a reply to the webhook of step 340 as an HTTP response to the webhook server 330 in step 345. The reply in step 345 registers the webhook target 320 to events having a topic of topic-1 (which may or may not be the same topic as the webhook of step 340). In general, the reply may include zero or more event filters, such as blocking of events of a given topic, temporarily or forever. The reply of step 345 may also contain filters to enable more events, for example, by reducing the required severity level, for specific topics. The reply may also contain filter revocations, for example, using the registration status "cancel." The exact nature of the filters, the event fields they refer to, and their management is up to the discretion of the webhook target 320.

The webhook server 330 receives the reply comprising the zero or more event preferences from the webhook target 320 as an HTTP response. The webhook server 330 parses the reply into rules of event blocking, event sending, and/or cancelation of existing rules. In this manner the rule-based event preferences in the event registration rule repository 140 are dynamic. In addition, the webhook server 330 may register the event preferences in a database, for later analysis.

In step 350, the webhook server 330 sends the webhook target 320 a webhook having a topic of topic-1. The webhook target 320 receives the event and prepares zero or more event preferences to return as a reply to the webhook of step 350 as an HTTP response to the webhook server 330 in step 355. The reply in step 355 registers the webhook target 320 to events having a topic of topic-2.

In step 360, the webhook server 330 sends the webhook target 320 a webhook having a topic of topic-2. In step 365, the webhook server 330 sends the webhook target 320 a webhook having a topic of topic-1. The webhook target 320 receives the events of steps 360 and 365 and may prepare zero or more event preferences to return as a reply (not shown in FIG. 3).

Figure 4:
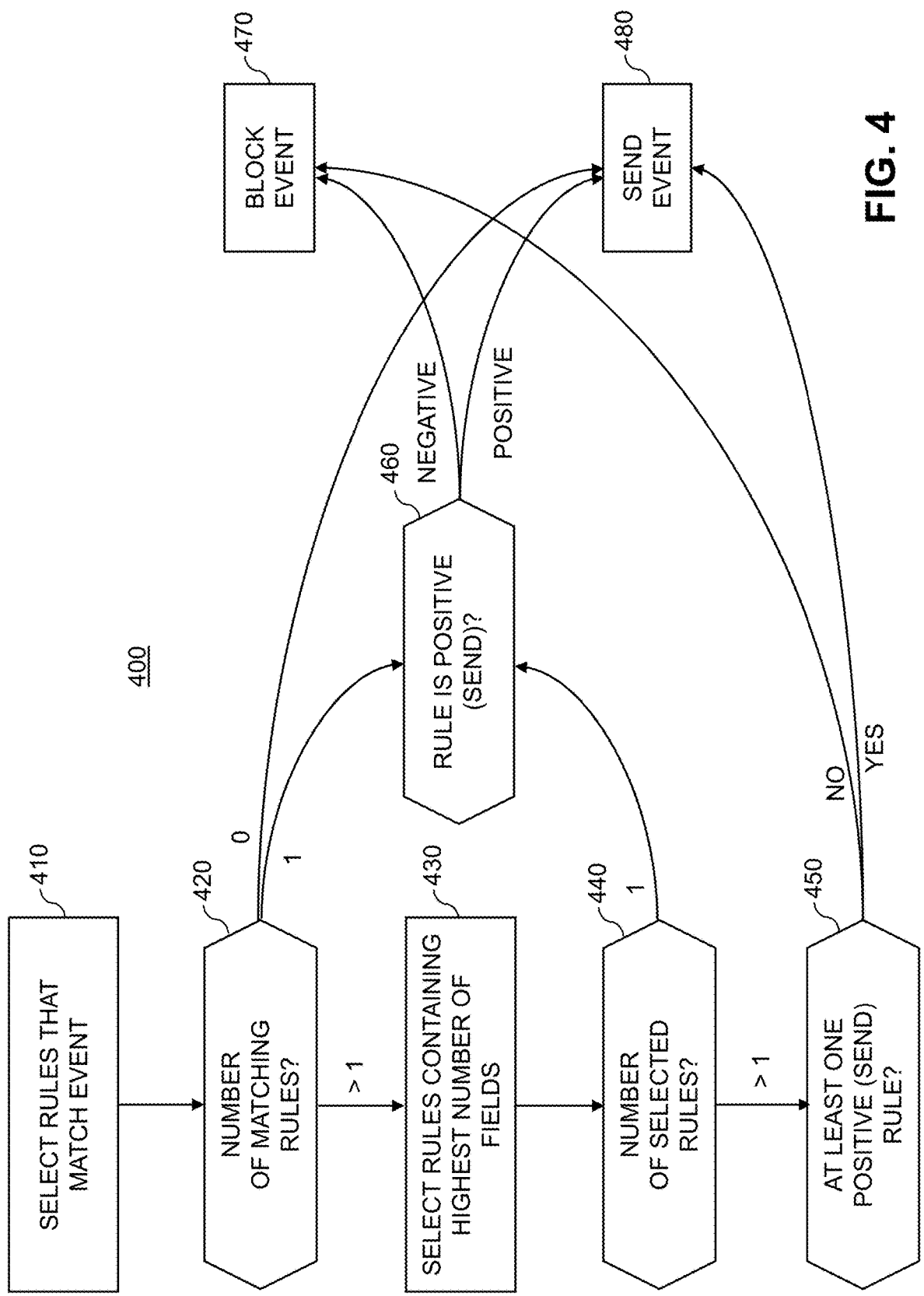
FIG. 4 is a flow chart illustrating an exemplary implementation of a rule filtering and arbitration process for in-band modification of event notification preferences, according to one embodiment of the disclosure.

FIG. 4 is a flow chart illustrating an exemplary implementation of a rule filtering and arbitration process 400 for in-band modification of event notification preferences, according to one embodiment of the disclosure. The rule filtering and arbitration process 400 may be implemented, for example, by the rule filtering and arbitration module 134 of FIG. 1. In some embodiments, the exemplary rule filtering and arbitration module 134 implements one or more event preference rule resolution criteria, discussed hereinafter, in order to determine which rules to apply to a given event notification.

For example, in case of a rule conflict (e.g., more than one rule that matches a given event notification), the rule resolution is done in at least some embodiments according to the following rules, in order:

1. The more specific filter, relevant to the list of event fields that contains all fields of the other filters and adds to them (not all filters can be ordered in a hierarchy of their matching fields, so this rule cannot always be used).
2. The filter that matches the most event fields (there may be several such filters, and then the third rule applies).
3. In the case of a tie between filters matching the greatest number of fields of the event, if there is at least one filter to send the event, then this filter prevails.

For example, if there is one rule to send all events of severity "error," and there is another rule not to send events of topic "SDS," an event of severity "error" for topic "SDS" will be sent. If there is a rule not to send "SDS" "error" events, however, then the event will not be sent. In any event, an event of severity "error" with no topic, or with a topic other than "SDS," will be sent.

In the example of FIG. 4, the above-described event preference rule resolution criteria are applied to a given event notification. In step 410, the rules that match the given event notification are selected. The number of such matching rules is then determined in step 420. If it is determined in step 420 that the number of matching rules is zero (0), then the event notification is sent in step 480. If, however, it is determined in step 420 that the number of matching rules is one (1), then a test is performed in step 460 to determine if the rule is positive (e.g., send the event notification), discussed further below.

If it is determined in step 420 that the number of matching rules is greater than one (>1), then the rules containing the highest number of fields are selected in step 430. The number of such selected rules is then determined in step 440. If it is determined in step 440 that the number of selected rules is one (1), then the test is performed in step 460 to determine if the rule is positive (e.g., send the event notification). If it is determined in step 460 that the rule is positive, then the event notification is sent in step 480. If, however, it is determined in step 460 that the rule is negative, then the event notification is blocked in step 470.

If, however, it was determined in step 440 that the number of selected rules is greater than one (>1), then a test is performed in step 450 to determine if there is at least one positive rule (e.g., send the event notification). If it is determined in step 450 that there is not at least one positive rule, then the event notification is blocked in step 470. If, however, it is determined in step 450 that there is at least one positive rule, then the event notification is sent in step 480.

FIG. 5 illustrates an exemplary table 500 for recording rule-based event notification preferences of a given event client node 110 of FIG. 1, according to an embodiment. In the example of FIG. 5, the exemplary table 500 comprises a record for each rule 510 and indicates the corresponding webhook target 520, one or more filters 530 and an indication of whether a given event matching the corresponding rule should be sent or blocked in field 540.

The exemplary rules in the table 500 can, for example, filter events by severity level, and/or filter events by severity level, specific resources, and zero or more additional event attributes. For example, rule 2 in the table 500 will send all events having a severity of "error" a topic of "hardware (hw) failure" and a resource type of "power supply." In addition, rule 5 will send all event notifications having a severity of "critical."

Figure 6:
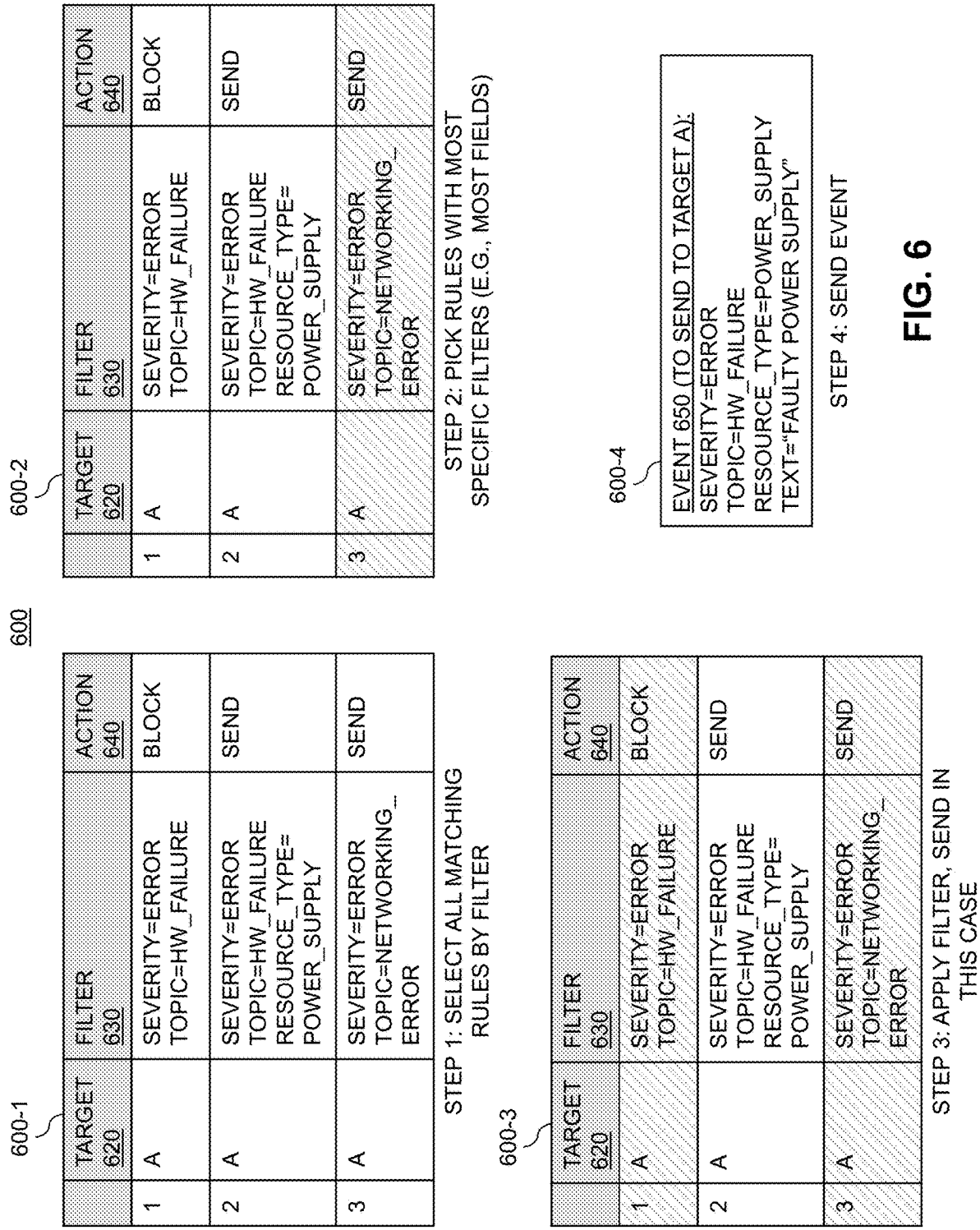
FIG. 6 provides an example of rule filtering and arbitration of events for a given event client node of FIG. 1, according to one or more embodiments.

FIG. 6 provides an example 600 of rule filtering and arbitration of event notifications for a given event client node 110 of FIG. 1, according to one or more embodiments. In the example of FIG. 6, the applicable rules for the given event client node 110 (e.g., "target A" in field 620) are based on rules 1-3 of the table 500 of FIG. 5, as shown in table 600-1. Each rule 1-3 comprises one or more filters in field 630 and a corresponding indicated action (e.g., block or send) in field 540 to perform for an event matching the corresponding rule. In addition, the example assumes an event 650 in table 600-4 comprises a severity of "error," a topic of "hardware failure" and a resource type of "faulty power supply."

In step 1, the rules from the table 600-1 (e.g., from rules 1-3) that match the event 650 are selected. It is noted that rule 3 does not match the event, so rule 3 is not selected in step 1 and is shown with a hashed pattern in table 600-2. In step 2, the rules with the most specific filters (e.g., rules having the most fields) are selected from the matching rules 1 and 2 of table 600-2. It is noted that rule 2 has more fields than rule 1, so rule 2 is selected in step 2 and rule 1 is also shown with a hashed pattern in table 600-3.

In step 3, the filter of rule 2 is applied to the event 650 and the action 640 of rule 2 will be performed to send the event 650 to target A (e.g., a given event client node 110) in step 4, as shown by table 600-4.

Figure 7:
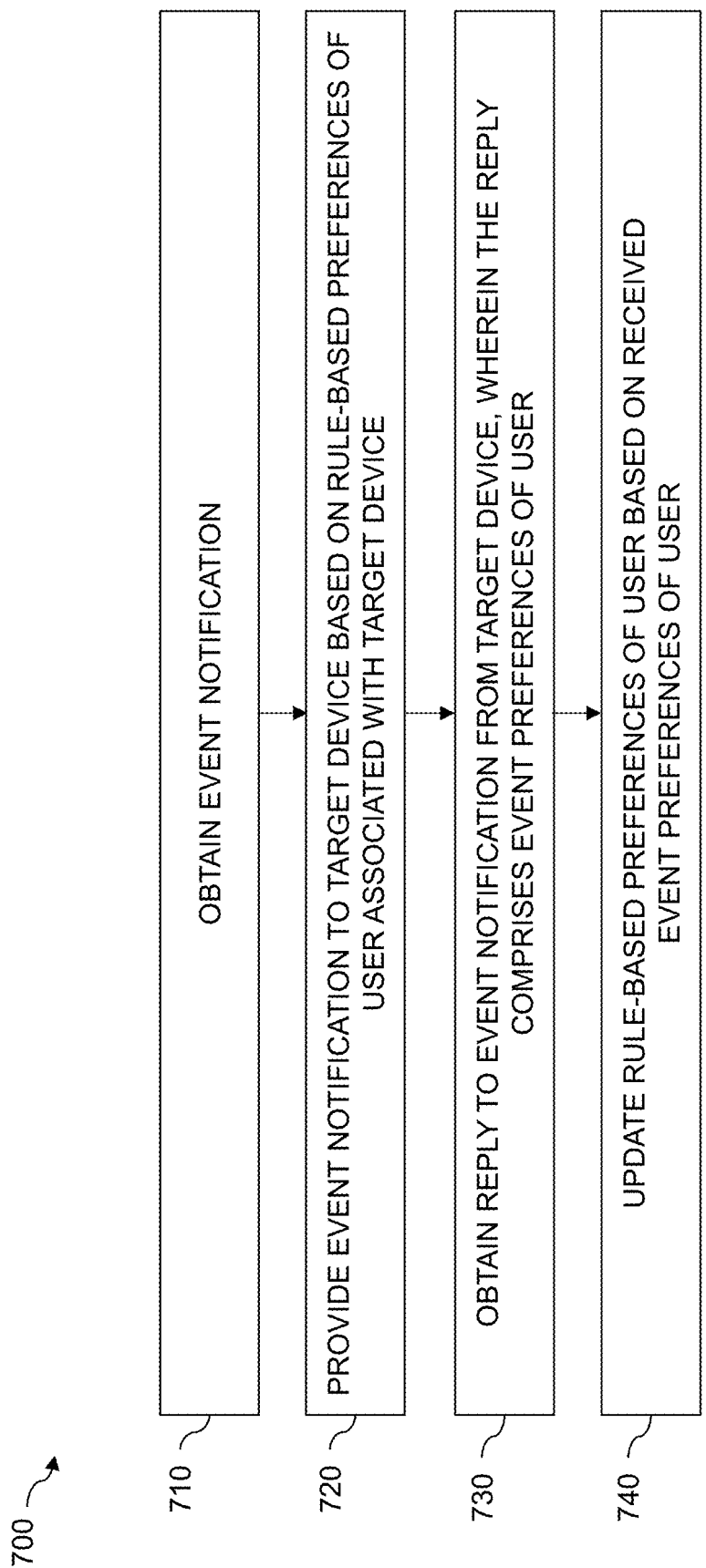
FIG. 7 illustrates an exemplary process for providing in-band modification of event notification preferences for server events, according to an embodiment.

FIG. 7 illustrates an exemplary process 700 for providing in-band modification of event notification preferences for server events, according to an embodiment. As shown in FIG. 7, in step 710, an event notification is obtained. In step 720, the event notification is provided to the indicated target device (e.g., a given event client node 110) based on one or more rule-based preferences of the user associated with the indicated target device.

In the example of FIG. 7, a reply to the event notification is obtained from the indicated target device in step 730, wherein the reply comprises one or more event preferences of the user. The rule-based preferences of the user are then updated in step 740 based on the received event preferences of the user included in the reply.

In some embodiments, the updating the one or more rule-based preferences of the user comprises one or more of creating, modifying and canceling at least one event preference rule of the user. A plurality of the event preference rules matching the event notification may be resolved in an order determined by one or more event preference rule resolution criteria.

The particular processing operations and other network functionality described in conjunction with the communication diagram of FIG. 3 and/or the flow diagrams of FIGS. 4 and 7, for example, are presented by way of illustrative example only, and should not be construed as limiting the scope of the disclosure in any way. Alternative embodiments can use other types of processing operations to provide in-band modification of event notification preferences for server events using the disclosed techniques. For example, the ordering of the process steps may be varied in other embodiments, or certain steps may be performed concurrently with one another rather than serially. In one aspect, the process can skip one or more of the actions. In other aspects, one or more of the actions are performed simultaneously. In some aspects, additional actions can be performed.

In one or more embodiments, the disclosed techniques for providing in-band modification of event notification preferences for server events provide proactive, fine tuning of event registration to event-driven APIs and/or a fine granularity of registration options. Among other benefits, the fine granularity of the rules, and their dynamic nature, can be used by the event management node 130 to fine tune the event dispatch mechanism. In addition, the disclosed techniques for modifying event notification preferences can be used to induce expected user behavior, and metrics of interest (e.g., giving hints to the way a user uses the system, such as the event management node 130). This data can be used to plan systems that better serve customer needs and/or as an input for machine learning engines to dynamically fine tune the event notification system.

In one example, the machine learning-based rule induction module 138 of the event management node 130 can be used to analyze changing filtering rules in the event registration rule repository 140. The machine learning-based rule induction module 138 can employ inductive learning to start sending previously blocked events, or to start blocking previously sent events, due to registration, blocking of specific events or other event notification preferences returned by a given event client node 110. The event management node 130 can add and/or modify rules that are induced to the event registration rule repository 140.

In another example, when a given event client node 110 changes one or more rules, the event management node 130 can induce important system behaviors and fine tune the system itself accordingly (e.g., the software-defined storage system in the example of FIG. 1). For example, if the user (e.g., using a given event client node 110) updates the rules to get more capacity-related events for the exemplary software-defined storage system, the event management node 130 can optimize the exemplary software-defined storage system (or portions thereof) for capacity usage. Thereafter, if the user starts monitoring for more latency-related events, the event management node 130 can optimize the exemplary software-defined storage system (or portions thereof) for a faster response.

As noted above, one or more embodiments of the disclosure are illustrated herein using webhooks as an example Application Programming Interface (API). In further variations, other event-driven APIs may also be employed, such as web sockets and MQ. Web sockets provide a full duplex protocol for an event-driven API. The disclosed in-band fine-granularity event filters can be implemented in web sockets using regular REST calls to the server, as would be apparent to a person of ordinary skill in the art. In addition, event preferences can be sent at any time, unrelated to events sent to the client.

In another exemplary implementation, the disclosed in-band fine-granularity event filters can be implemented in publish/subscribe message systems, such as MQ, which are also full duplex. Messages can be defined that represent events (e.g., sent from the "server" to the "client"). Messages that represent event preferences can be sent from the "client" back to the "server". Again, event preferences can be sent at any time, unrelated to events sent to the client.

In another variation, server-side, implicit event filters can be employed. Event preferences can be refined by letting the client provide a thumbs up or thumbs down vote on specific received events (e.g., similar to the "true" or "false" responses described above), and not defining rules according to event fields. The webhook server can then induce from the blocked events the implied filtering rules of the client. Over time, the webhook client's reaction to events (e.g., up/down vote) reinforces the learning engine of the server. The server can fine tune the filters according to the client's behavior. For example, the server can learn to stop sending events for specific topics, or specific severity. In addition, the server can learn to (i) automatically throttle repetitive or related events or (ii) apply temporal filters, such as sending more low-severity events in the case of a rolling error scenario, and only high-severity events during standard operations.

Figure 8:
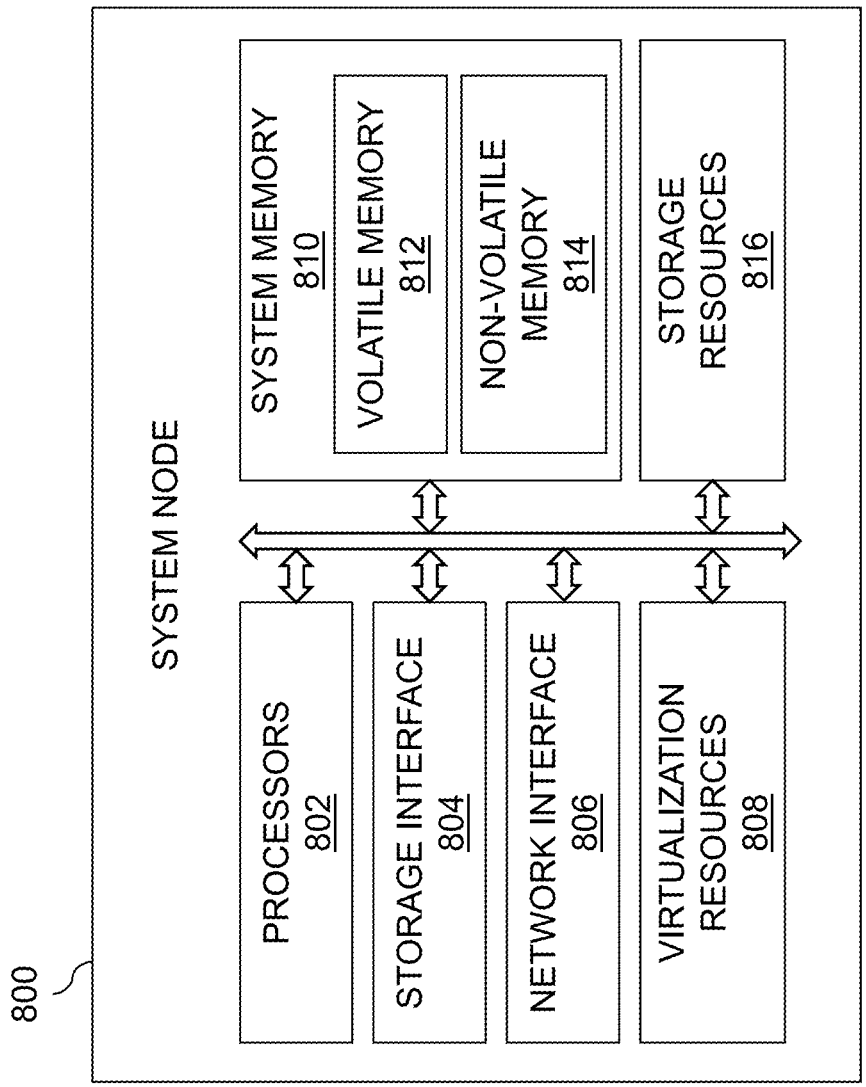
FIG. 8 schematically illustrates a system node which can be implemented in the system of FIG. 1 for hosting a software-defined storage system, or portions thereof, according to an exemplary embodiment of the disclosure.

FIG. 8 schematically illustrates a system node 800 that can be implemented in the system 100 of FIG. 1 for hosting a software-defined storage control system, or portions thereof, according to an exemplary embodiment of the disclosure. In particular, FIG. 8 schematically illustrates an exemplary hardware architecture of an event management node 130 and/or a data control and storage resource node 150 of FIG. 1, or portions thereof. The system node 800 comprises processors 802, storage interface circuitry 804, network interface circuitry 806, virtualization resources 808, system memory 810, and storage resources 816. The system memory 810 comprises volatile memory 812 and non-volatile memory 814.

The processors 802 comprise one or more types of hardware processors that are configured to process program instructions and data to execute a native operating system (OS) and applications that run on the system node 800. For example, the processors 802 may comprise one or more CPUs, microprocessors, microcontrollers, application specific integrated circuits (ASICs), field programmable gate arrays (FPGAs), and other types of processors, as well as portions or combinations of such processors. The term "processor" as used herein is intended to be broadly construed so as to include any type of processor that performs processing functions based on software, hardware and/or firmware. For example, a "processor" is broadly construed so as to encompass all types of hardware processors including, for example, (i) general purpose processors which comprise "performance cores" (e.g., low latency cores), and (ii) workload-optimized processors, which comprise any possible combination of multiple "throughput cores" and/or multiple hardware-based accelerators. Examples of workload-optimized processors include, for example, graphics processing units (GPUs), digital signal processors (DSPs), system-on-chip (SoC), tensor processing units (TPUs), image processing units (IPUs), deep learning accelerators (DLAs), artificial intelligence (AI) accelerators, and other types of specialized processors or coprocessors that are configured to execute one or more fixed functions.

The storage interface circuitry 804 enables the processors 802 to interface and communicate with the system memory 810, the storage resources 816, and other local storage and off-infrastructure storage media, using one or more standard communication and/or storage control protocols to read data from or write data to volatile and non-volatile memory/storage devices. Such protocols include, but are not limited to, NVMe, PCIe, PATA, SATA, Serial Attached SCSI (SAS), and Fibre Channel. The network interface circuitry 806 enables the system node 800 to interface and communicate with a network and other system components. The network interface circuitry 806 comprises network controllers such as network cards and resources (e.g., network interface controllers (NICs) (e.g., SmartNICs, RDMA-enabled NICs), Host Bus Adapter (HBA) cards, Host Channel Adapter (HCA) cards, I/O adaptors, and converged Ethernet adaptors) to support communication protocols and interfaces including, but not limited to, PCIe, DMA and RDMA data transfer protocols.

The virtualization resources 808 can be instantiated to execute one or more services or functions which are hosted by the system node 800. For example, the virtualization resources 808 can be configured to implement the various modules and functionalities of the event management node 130 of FIG. 1. In one embodiment, the virtualization resources 808 comprise virtual machines that are implemented using a hypervisor platform which executes on the system node 800, wherein one or more virtual machines can be instantiated to execute functions of the system node 800. As is known in the art, virtual machines are logical processing elements that may be instantiated on one or more physical processing elements (e.g., servers, computers, or other processing devices). That is, a "virtual machine" generally refers to a software implementation of a machine (i.e., a computer) that executes programs in a manner similar to that of a physical machine. Thus, different virtual machines can run different operating systems and multiple applications on the same physical computer.

A hypervisor is an example of what is more generally referred to as "virtualization infrastructure." The hypervisor runs on physical infrastructure, e.g., CPUs and/or storage devices, of the system node 800, and emulates the CPUs, memory, hard disk, network and other hardware resources of the host system, enabling multiple virtual machines to share the resources. The hypervisor can emulate multiple virtual hardware platforms that are isolated from each other, allowing virtual machines to run, e.g., Linux and Windows Server operating systems on the same underlying physical host. The underlying physical infrastructure may comprise one or more commercially available distributed processing platforms which are suitable for the target application.

In another embodiment, the virtualization resources 808 comprise containers such as Docker containers or other types of Linux containers (LXCs). As is known in the art, in a container-based application framework, each application container comprises a separate application and associated dependencies and other components to provide a complete filesystem, but shares the kernel functions of a host operating system with the other application containers. Each application container executes as an isolated process in user space of a host operating system. In particular, a container system utilizes an underlying operating system that provides the basic services to all containerized applications using virtual-memory support for isolation. One or more containers can be instantiated to execute one or more applications or functions of the system node 800 as well as execute one or more of the various modules and functionalities of the control systems of FIG. 1, as discussed herein. In yet another embodiment, containers may be used in combination with other virtualization infrastructure such as virtual machines implemented using a hypervisor, wherein Docker containers or other types of LXCs are configured to run on virtual machines in a multi-tenant environment.

The various software modules that provide in-band modification of event notification preferences for server events comprise program code that is loaded into the system memory 810 (e.g., volatile memory 812), and executed by the processors 802 to perform respective functions as described herein. In this regard, the system memory 810, the storage resources 816, and other memory or storage resources as described herein, which have program code and data tangibly embodied thereon, are examples of what is more generally referred to herein as "processor-readable storage media" that store executable program code of one or more software programs. Articles of manufacture comprising such processor-readable storage media are considered embodiments of the disclosure. An article of manufacture may comprise, for example, a storage device such as a storage disk, a storage array or an integrated circuit containing memory. The term "article of manufacture" as used herein should be understood to exclude transitory, propagating signals.

The system memory 810 comprises various types of memory such as volatile RAM, NVRAM, or other types of memory, in any combination. The volatile memory 812 may be a dynamic random-access memory (DRAM) (e.g., DRAM DIMM (Dual In-line Memory Module), or other forms of volatile RAM. The non-volatile memory 814 may comprise one or more of a NAND Flash storage device, an SSD device, or other types of next generation non-volatile memory (NGNVM) devices. The system memory 810 can be implemented using a hierarchical memory tier structure wherein the volatile memory 812 is configured as the highest-level memory tier, and the non-volatile memory 814 (and other additional non-volatile memory devices which comprise storage-class memory) is configured as a lower level memory tier which is utilized as a high-speed load/store non-volatile memory device on a processor memory bus (i.e., data is accessed with loads and stores, instead of with I/O reads and writes). The term "memory" or "system memory" as used herein refers to volatile and/or non-volatile memory which is utilized to store application program instructions that are read and processed by the processors 802 to execute a native operating system and one or more applications or processes hosted by the system node 800, and to temporarily store data that is utilized and/or generated by the native OS and application programs and processes running on the system node 800. The storage resources 816 can include, for example, one or more HDDs and/or SSD storage devices.

It is to be understood that the above-described embodiments of the disclosure are presented for purposes of illustration only. Many variations may be made in the particular arrangements shown. For example, although described in the context of particular system and device configurations, the techniques are applicable to a wide variety of other types of information processing systems, computing systems, data storage systems, processing devices and distributed virtual infrastructure arrangements. In addition, any simplifying assumptions made above in the course of describing the illustrative embodiments should also be viewed as exemplary rather than as requirements or limitations of such embodiments. Numerous other alternative embodiments within the scope of the appended claims will be readily apparent to those skilled in the art.

What is claimed is:

1. A method, comprising:
obtaining an event notification;
providing the event notification to at least one target device based at least in part on one or more rule-based preferences of a user associated with the at least one target device;
obtaining a reply to the event notification from the at least one target device, wherein the reply comprises one or more event preferences of the user; and
updating the one or more rule-based preferences of the user based at least in part on the one or more event preferences of the user obtained in the reply to the event notification;
wherein the method is performed by at least one processing device comprising a processor coupled to a memory.

2. The method of claim 1, wherein the event notification comprises one or more key-value pairs.

3. The method of claim 1, wherein the event notification comprises a topic, an event identifier and an event severity level.

4. The method of claim 1, wherein the reply comprises a value of one of true, false and cancel.

5. The method of claim 1, wherein the updating the one or more rule-based preferences of the user comprises one or more of creating, modifying and canceling at least one event preference rule of the user.

6. The method of claim 5, wherein the event notification is provided to the user unless at least one of the at least one event preference rule of the user blocks the event notification.

7. The method of claim 5, wherein a plurality of the at least one event preference rule that matches the event notification is resolved in an order determined by one or more event preference rule resolution criteria.

8. The method of claim 1, further comprising, in response to the obtaining the event notification, obtaining one or more event preference rules of the user and evaluating the event notification against the obtained one or more event preference rules.

9. The method of claim 1, further comprising employing a machine learning tool to induce one or more of (i) the event preferences of the user based on behavior of the user and (ii) one or more system parameters based on the event preferences of the user.

10. An apparatus comprising:
at least one processing device comprising a processor coupled to a memory;
the at least one processing device being configured to implement the following steps:
obtaining an event notification;
providing the event notification to at least one target device based at least in part on one or more rule-based preferences of a user associated with the at least one target device;
obtaining a reply to the event notification from the at least one target device, wherein the reply comprises one or more event preferences of the user; and
updating the one or more rule-based preferences of the user based at least in part on the one or more event preferences of the user obtained in the reply to the event notification.

11. The apparatus of claim 10, wherein the event notification comprises a topic, an event identifier and an event severity level.

12. The apparatus of claim 10, wherein the reply comprises a value of one of true, false and cancel.

13. The apparatus of claim 10, wherein the updating the one or more rule-based preferences of the user comprises one or more of creating, modifying and canceling at least one event preference rule of the user.

14. The apparatus of claim 13, wherein the event notification is provided to the user unless at least one of the at least one event preference rule of the user blocks the event notification.

15. The apparatus of claim 13, wherein a plurality of the at least one event preference rule that matches the event notification is resolved in an order determined by one or more event preference rule resolution criteria.

16. A non-transitory processor-readable storage medium having stored therein program code of one or more software programs, wherein the program code when executed by at least one processing device causes the at least one processing device to perform the following steps:
   obtaining an event notification;
   providing the event notification to at least one target device based at least in part on one or more rule-based preferences of a user associated with the at least one target device;
   obtaining a reply to the event notification from the at least one target device, wherein the reply comprises one or more event preferences of the user; and
   updating the one or more rule-based preferences of the user based at least in part on the one or more event preferences of the user obtained in the reply to the event notification.

17. The non-transitory processor-readable storage medium of claim 16, wherein the event notification comprises a topic, an event identifier and an event severity level.

18. The non-transitory processor-readable storage medium of claim 16, wherein the reply comprises a value of one of true, false and cancel.

19. The non-transitory processor-readable storage medium of claim 16, wherein the updating the one or more rule-based preferences of the user comprises one or more of creating, modifying and canceling at least one event preference rule of the user.

20. The non-transitory processor-readable storage medium of claim 19, wherein the event notification is provided to the user unless at least one of the at least one event preference rule of the user blocks the event notification.

* * * * *